(12) United States Patent
Gross

(10) Patent No.: US 12,570,511 B2
(45) Date of Patent: Mar. 10, 2026

(54) FORK MOVING ASSEMBLY

(71) Applicant: Nathan Gross, Hartland, WI (US)

(72) Inventor: Nathan Gross, Hartland, WI (US)

( * ) Notice: Subject to any disclaimer, the term of this patent is extended or adjusted under 35 U.S.C. 154(b) by 398 days.

(21) Appl. No.: 18/118,772

(22) Filed: Mar. 8, 2023

(65) Prior Publication Data

US 2024/0300790 A1 Sep. 12, 2024

(51) Int. Cl.
*B66F 9/12* (2006.01)
*B66F 9/075* (2006.01)

(52) U.S. Cl.
CPC ............ *B66F 9/12* (2013.01); *B66F 9/07504* (2013.01)

(58) Field of Classification Search
CPC ...... E02F 3/962; E02F 3/3686; B60F 9/07504
USPC .......................................................... 414/912
See application file for complete search history.

(56) References Cited

U.S. PATENT DOCUMENTS 3,498,485 A * 3/1970 Godbersen .............. B66F 9/065 414/607
4,805,707 A * 2/1989 Davis ..................... B25D 17/24 248/580
4,846,499 A 7/1989 Izumi
D347,950 S 6/1994 Cisero
6,702,122 B2 3/2004 Hopkins
6,848,883 B2 * 2/2005 Atencio ............. A01D 87/0076 414/24.5
8,087,866 B2 * 1/2012 Fast .......................... B60R 9/06 414/24.5
11,186,963 B2 * 11/2021 Clearman ................. E02F 3/40
2003/0108413 A1 * 6/2003 Pemberton ................ B66F 9/06 414/685
2006/0239810 A1 * 10/2006 Penza ..................... E02F 3/966 414/723
2008/0085176 A1 * 4/2008 Statkus ..................... B60P 3/07 414/462
2013/0233812 A1 9/2013 Anzola
2016/0157637 A1 6/2016 Hokanson

FOREIGN PATENT DOCUMENTS

CA 2435082 11/2004

* cited by examiner

*Primary Examiner* — Mark C Hageman

(57) ABSTRACT

A fork moving assembly for transporting a telehandler fork includes an adapter plate that has a hitch tube which is insertable into a hitch receiver that is attached to a skid steer such that the adapter plate can be maneuvered by the skid steer. The adapter plate has a pair of attachment points and a coupling pin is insertable through each of the attachment points on the adapter plate. Additionally, the coupling pin extends through an engagement on a telehandler fork thereby facilitating the skid steer to maneuver the telehandler fork. In this way the coupling pin and the adapter plate allow the telehandler fork to be maneuvered without having to be manually carried.

7 Claims, 6 Drawing Sheets

FORK MOVING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fork devices and more particularly pertains to a new fork device for transporting a telehandler fork with a skid steer. The device includes an adapter plate and a hitch tube which extends away from the adapter plate thereby facilitating the hitch tube to engage a hitch receiver that is attached to a skid steer. The adapter plate has a pair of engagement points which extend in an opposite direction from the hitch tube. Furthermore, the device includes a pin that is insertable through each of the engagement points and through an engagement of a telehandler fork

(2) Description of Related Art Including Information Disclosed Under 37 CFR 1.97 and 1.98

The prior art relates to fork devices including a support bracket that includes a pair of hinged sleeves and a bracket that is pivotally disposed between the pair of hinged sleeves. The prior art discloses a rack for storing fork lift extension members that stores the fork lift extension members in a vertical orientation. The prior art discloses a load lift attachment for increasing the load capacity of a skid steer that includes a C-shaped frame member and casters disposed on the C-shaped frame member. The prior art discloses a folk lift fork storage rack for storing a plurality of fork lift forks in a horizontal orientation.

BRIEF SUMMARY OF THE INVENTION

An embodiment of the disclosure meets the needs presented above by generally comprising an adapter plate that has a hitch tube which is insertable into a hitch receiver that is attached to a skid steer thereby facilitating the adapter plate to be maneuvered by the skid steer. The adapter plate has a pair of attachment points and a coupling pin is insertable through each of the attachment points on the adapter plate. Additionally, the coupling pin extends through an engagement on a telehandler fork thereby facilitating the skid steer to maneuver the telehandler fork. In this way the coupling pin and the adapter plate facilitate the telehandler fork to be maneuvered without having to be manually carried.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
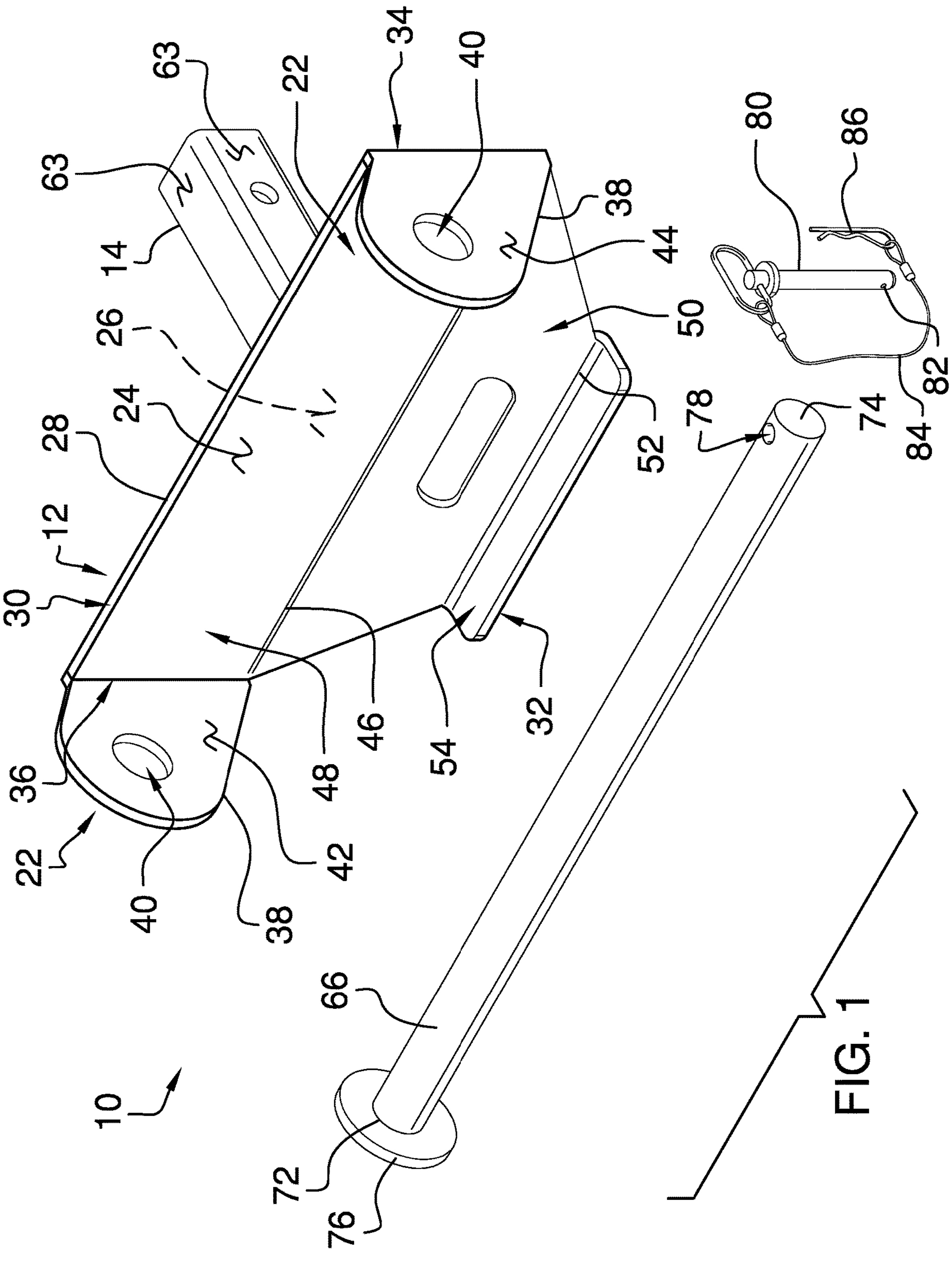
FIG. 1 is an exploded perspective view of a fork moving assembly according to an embodiment of the disclosure.
Figure 2:
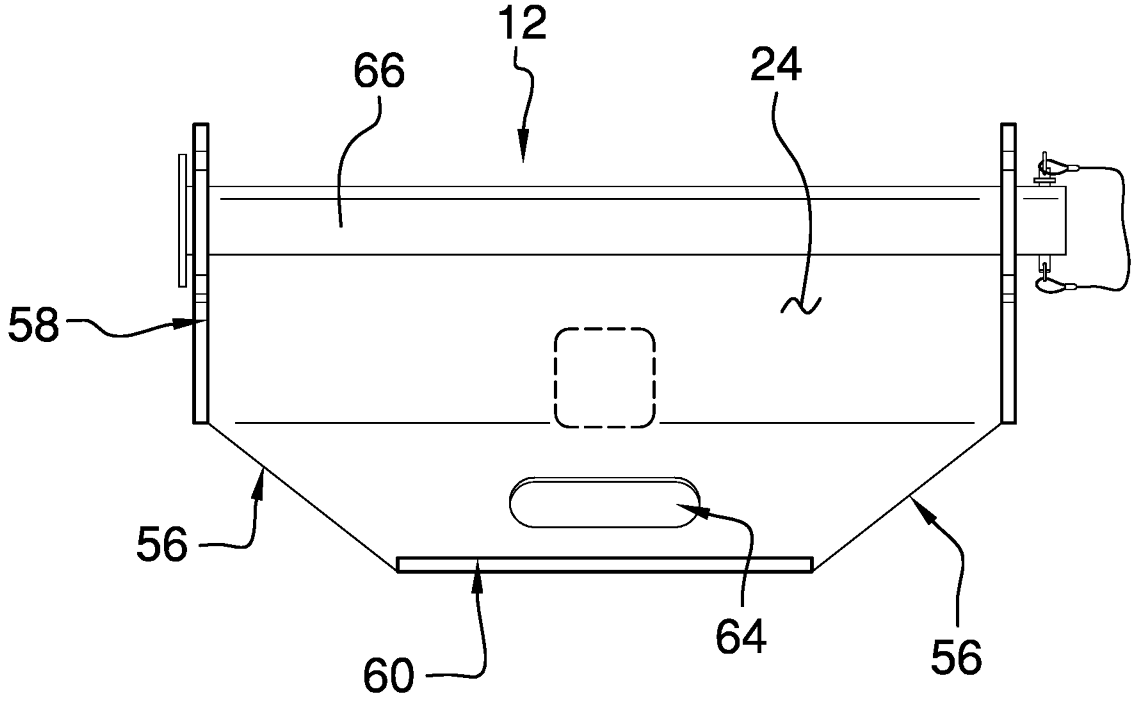
FIG. 2 is a front view of an embodiment of the disclosure.
Figure 3:
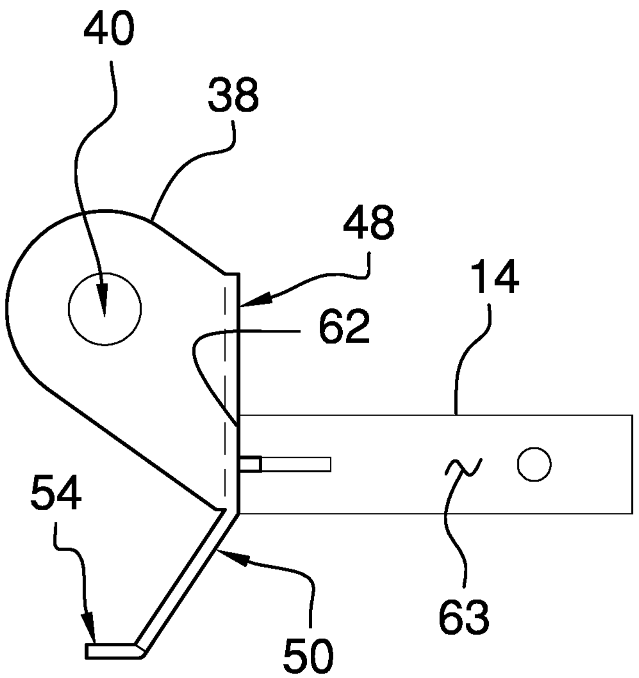
FIG. 3 is a left side view of an embodiment of the disclosure.
Figure 4:
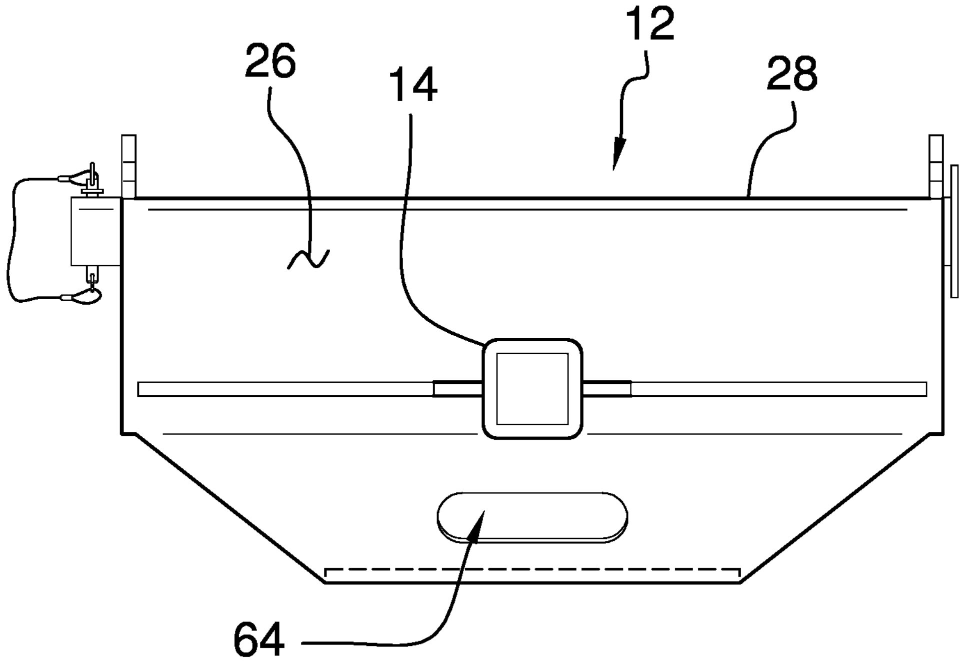
FIG. 4 is a back view of an embodiment of the disclosure.
Figure 5:
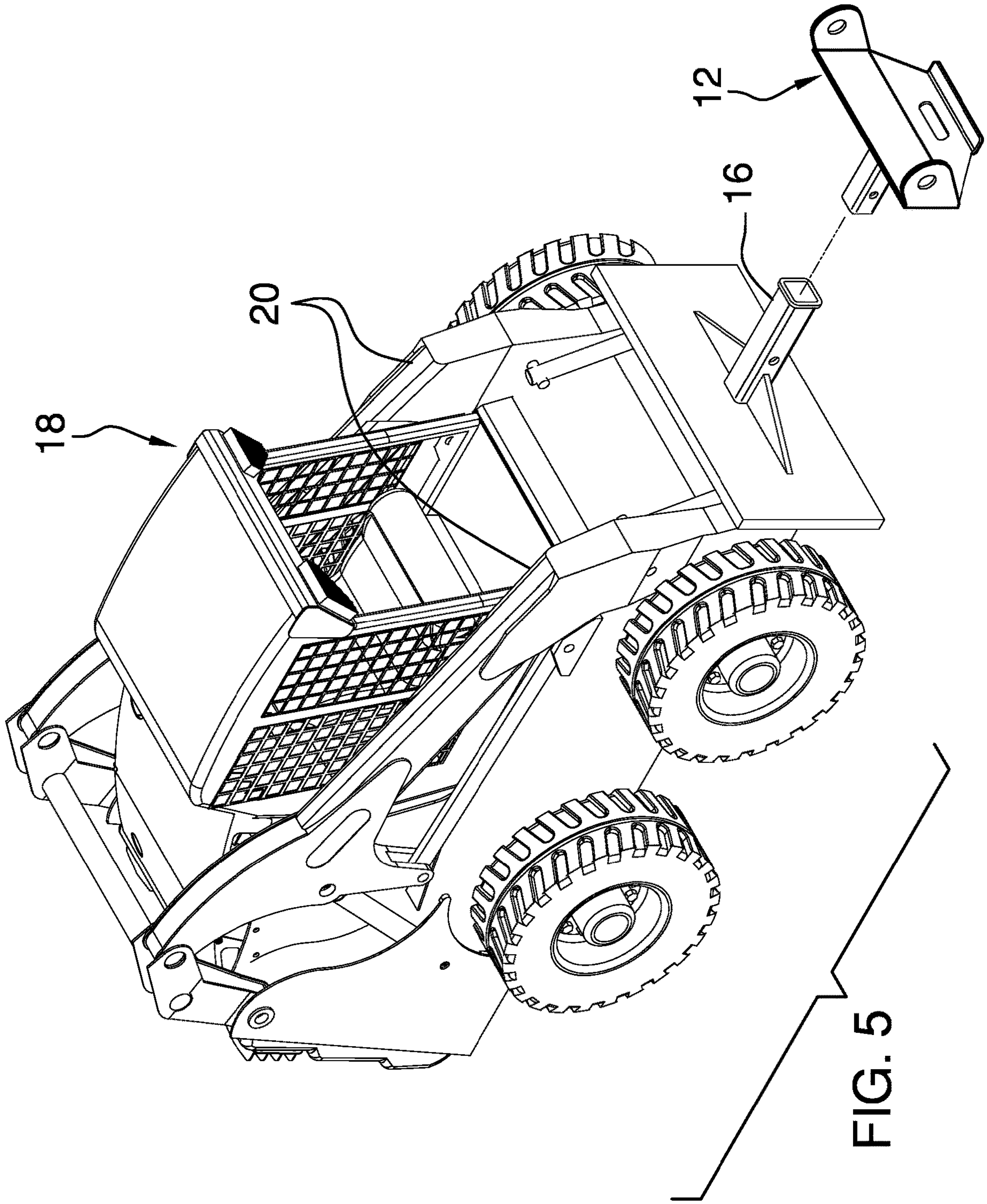
FIG. 5 is an exploded in-use view of an embodiment of the disclosure.
Figure 6:
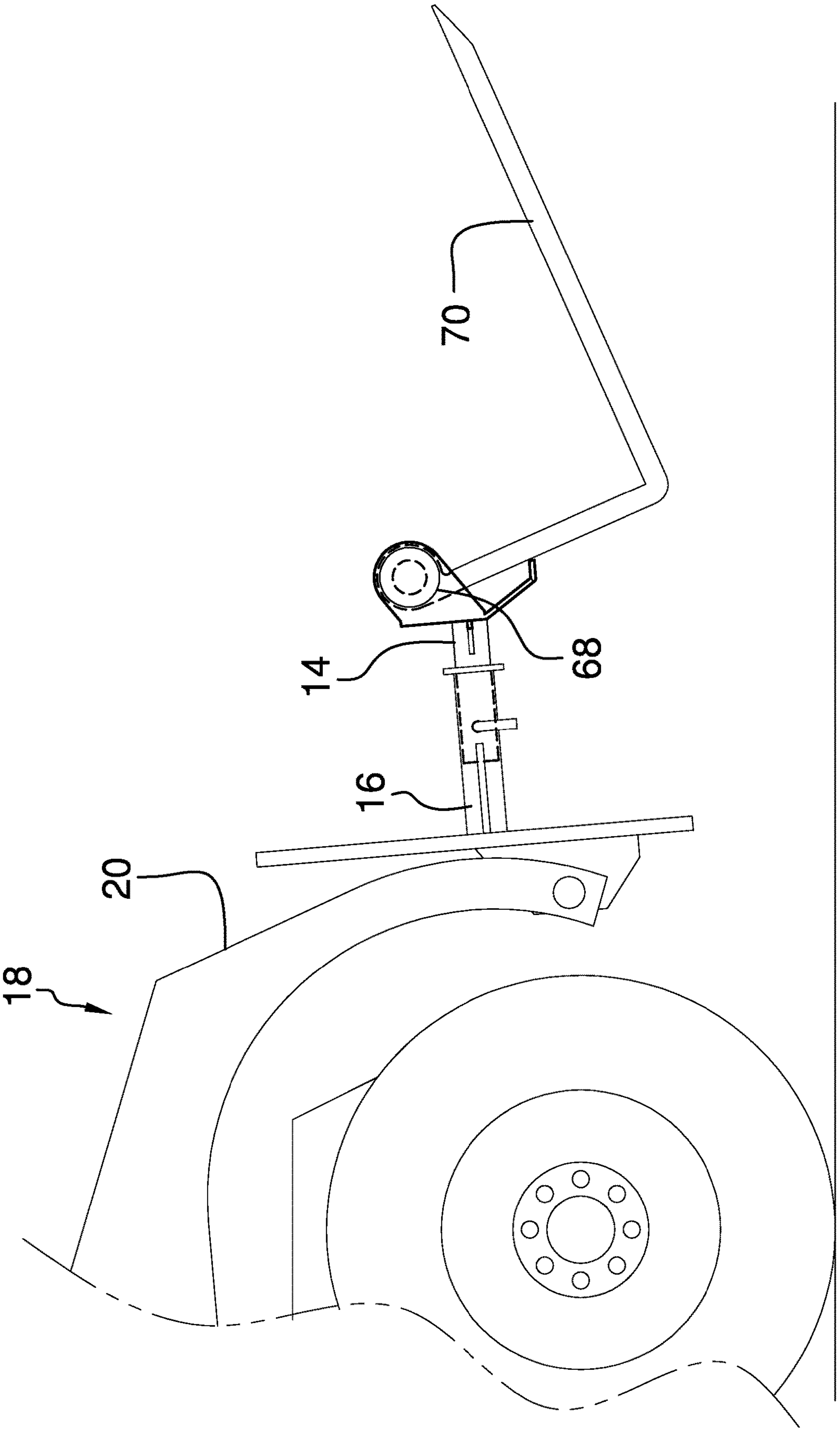
FIG. 6 is a perspective in-use view of an embodiment of the disclosure.

With reference now to the drawings, and in particular to FIGS. 1 through 6 thereof, a new fork device embodying the principles and concepts of an embodiment of the disclosure and generally designated by the reference numeral 10 will be described.

As best illustrated in FIGS. 1 through 6, the fork moving assembly 10 generally comprises an adapter plate 12 that has a hitch tube 14 which is insertable into a hitch receiver 16 that is attached to a skid steer 18 thereby facilitating the adapter plate 12 to be maneuvered by the skid steer 18. The skid steer 18 may comprise a motorized skid steer of any conventional design that might commonly be employed on a construction site, for example. Furthermore, the hitch receiver 16 might be attached to lifting arms 20 of the skid steer 18 in place of a bucket or forks that are commonly employed on skid steers. The adapter plate 12 has a pair of attachment points 22 that are spaced apart from each other and extend in an opposite direction from the hitch tube 14.

The adapter plate 12 has a front surface 24, a back surface 26 and a perimeter edge 28 extending between the front surface 24 and the back surface 26, and the perimeter edge 28 has a top side 30, a bottom side 32, a first lateral side 34 and a second lateral side 36. The adapter plate 12 has a pair of lobes 38 each disposed on a respective one of the first lateral side 34 and the second lateral side 36. Each of the lobes 38 is aligned with the top side 30 of the perimeter edge 28 and each of the lobes 38 lies on a plane that is perpendicularly oriented with the front surface 24. Each of the lobes 38 is oriented to angle upwardly beyond the top side 30 of the perimeter edge 28 and each of the lobes 38 has a hole 40 extending through a first lateral surface 42 and a second lateral surface 44 of the lobes 38 such that the hole 40 in each of the lobes 38 defines a respective one of the attachment points 22.

The adapter plate 12 has a first bend 46 extending between the first lateral side 34 and the second lateral side 36 of the perimeter edge 28 to define a top portion 48 of the adapter plate 12 forming an angle with a middle portion 50 of the adapter plate 12. The adapter plate 12 has a second bend 52 extending between the first lateral side 34 and the second lateral side 36 of the perimeter edge 28 to define a bottom portion 54 of the adapter plate 12 forming an angle with the middle portion 50. Furthermore, the bottom portion 54 lies on a plane that is perpendicularly oriented with the top portion 48. Each of the first lateral side 34 and the second lateral side 36 of the perimeter edge 28 has a middle section 56 angling inwardly between an upper section 58 and a lower section 60 of a respective first lateral side 34 and second lateral side 36. The upper section 58 of each of the first lateral side 34 and the second lateral side 36 is associated with the top portion 48 of the adapter plate 12. The middle section 56 of each of the first lateral side 34 and the second lateral side 36 is associated with the middle portion 50 of the adapter plate 12. Additionally, the lower section 60 of each of the first lateral side 34 and the second lateral side 36 is associated with the bottom portion 54 of the adapter plate 12.

The hitch tube 14 has a first end 62 that is coupled to the back surface 26 of the adapter plate 12. The hitch tube 14 is positioned on the top portion 48 of the adapter plate 12 and the hitch tube 14 is centrally positioned on the top portion 48. Furthermore, the hitch tube 14 has a plurality of exterior surfaces 63 which intersect each other such that the hitch tube 14 has a rectangular shape. The adapter plate 12 has a fork slot 64 extending through the front surface 24 and the back surface 26 of the adapter plate 12 thereby facilitating the fork slot 64 to accommodate a fork of the skid steer 18 when the skid steer 18 does not have a hitch receiver 16 to receive the hitch tube 14.

A coupling pin 66 is provided and the coupling pin 66 is insertable through each of the attachment points 22 on the adapter plate 12 having the coupling pin 66 extending through an pin collar 68 on a telehandler fork 70, or a fork for any other type of motorized implement that might commonly be employed on a construction site for example. In this way the skid steer 18 can maneuver the telehandler fork 70 to facilitate the telehandler fork 70 to be maneuvered without having to require a worker to manually carry the telehandler fork 70. The coupling pin 66 has a primary end 72 and a secondary end 74 and the coupling pin 66 has a washer 76 that is coupled to the primary end 72 having the washer 76 lying on a plane that is oriented perpendicular to an axis extending through the primary end 72 and the secondary end 74. The washer 76 abuts a respective one of the lobes 38 when the coupling pin 66 is inserted through the hole 40 in the respective lobe 38 having the coupling pin 66 extending through the hole 40 in an opposing one of the lobes 38 with respect to the respective lobe 38. The coupling pin 66 has an opening 78 extending through the coupling pin 66 and the opening 78 is spaced from the secondary end 74 of the coupling pin 66.

A securing pin 80 is provided which is insertable through the opening 78 in the coupling pin 66 when the coupling pin 66 is inserted through the hole 40 in each of the pair of lobes 38. In this way the securing pin 80 inhibits the coupling pin 66 from being removed from the hole 70 in each of the pair of lobes 38. The securing pin 80 has a hole 82 extending through the securing pin 80 and a cable 84 is attached to a the securing pin 80. A cotter pin 86 is attached to the cable 84 and the cotter pin 86 is insertable through the hole 82 in the securing pin 80 when the securing pin 80 is inserted through the opening 78 in the coupling pin 66 thereby inhibiting the securing pin 80 from being removed from the opening 78 in the coupling pin 66.

In use, the hitch tube 14 is inserted into the hitch receiver 16 to attach the adapter plate 12 the skid steer 18 and the skid steer 18 is driven to align the adapter plate 12 with the telehandler fork 70. The telehandler fork 70 is manipulated to position the pin collar 68 of the telehandler fork 70 between the pair of lobes 38. The coupling pin 66 is extended through the hole 40 in each of the lobes 38 such that the coupling pin 66 extends through a pin collar 88 of the telehandler fork 70. Additionally, the securing pin 80 is extended through the opening 78 in the coupling pin 66 and the cotter pin 86 is extended through the hole 82 in the securing pin 80. As is most clearly shown in FIG. 6, the telehandler fork 70 rests against the bottom portion 54 of the adapter plate 12 when the lifting arms 20 of the skid steer 18 lift the adapter plate 12. In this way the telehandler fork 70 can be transported with the skid steer 18 rather than being manually lifted or carried by a worker.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fork moving assembly for facilitating forks of a telehandler machine to be maneuvered with an incompatible skid steer, said assembly comprising:

an adapter plate having a hitch tube being insertable into a hitch receiver that is attached to a skid steer thereby facilitating said adapter plate to be maneuvered by said skid steer, said adapter plate having a pair of attachment points being spaced apart from each other and extending in an opposite direction from said hitch tube;

a coupling pin being insertable through each of said attachment points on said adapter plate having said coupling pin extending through a pin collar on a telehandler fork thereby facilitating said skid steer to maneuver said telehandler fork wherein said coupling pin and said adapter plate are configured to facilitate said telehandler fork to be maneuvered without having to be manually carried;

wherein said adapter plate has a front surface, a back surface and a perimeter edge extending between said front surface and said back surface, said perimeter edge having a top side, a bottom side, a first lateral side and a second lateral side;

wherein said adapter plate has a pair of lobes each being disposed on a respective one of said first lateral side and said second lateral side, each of said lobes being aligned with said top side of said perimeter edge, each of said lobes lying on a plane being perpendicularly oriented with said front surface, each of said lobes being oriented to angle upwardly beyond said top side of said perimeter edge;

wherein each of said lobes has a hole extending through a first lateral surface and a second lateral surface of said lobes such that said hole in each of said lobes defines a respective one of said attachment points;

wherein said adapter plate has a first bend extending between said first lateral side and said second lateral side of said perimeter edge to define a top portion of said adapter plate forming an angle with a middle portion of said adapter plate; and wherein said adapter plate has a second bend extending between said first lateral side and said second lateral side of said perimeter edge to define a bottom portion of said adapter plate forming an angle with said middle portion, said bottom portion lying on a plane being perpendicularly oriented with said top portion.

2. The assembly according to claim 1, wherein;

each of said first lateral side and said second lateral side of said perimeter edge has a middle section angling inwardly between an upper section and a lower section of a respective first lateral side and second lateral side;

said upper section of each of said first lateral side and said second lateral side is associated with said top portion of said adapter plate;

said middle section of each of said first lateral side and said second lateral side is associated with said middle portion of said adapter plate;

said lower section of each of said first lateral side and said second lateral side is associated with said bottom portion of said adapter plate.

3. The assembly according to claim 1, wherein said hitch tube has a first end being coupled to said back surface of said adapter plate, said hitch tube being positioned on said top portion of said adapter plate, said hitch tube being centrally positioned on said top portion, said hitch tube having a plurality of exterior surfaces intersecting each other such that said hitch tube has a rectangular shape.

4. The assembly according to claim 1, wherein said adapter plate has a fork slot extending through said front surface and said back surface of said adapter plate thereby facilitating said fork slot to accommodate a fork of said skid steer when said skid steer does not have a hitch receiver to receive said hitch tube.

5. The assembly according to claim 1, wherein:

said coupling pin has a primary end and a secondary end;

said coupling pin has a washer being coupled to said primary end having said washer lying on a plane being oriented perpendicular to an axis extending through said primary end and said secondary end, said washer abutting a respective one of said lobes when said coupling pin is inserted through said hole in said respective lobe having said coupling pin extending through said hole in an opposing one of said lobes with respect to said respective lobe; and said coupling pin has an opening extending through said coupling pin, said opening being spaced from said secondary end of said coupling pin.

6. The assembly according to claim 5, further comprising:

a securing pin being insertable through said opening in said coupling pin when said coupling pin is inserted through said hole in cach of said pair of lobes thereby inhibiting said coupling pin from being removed from said hole in each of said pair of lobes, said securing pin having a hole extending through said securing pin;

a cable being attached to a said securing pin; and a cotter pin being attached to said cable, said cotter pin being insertable through said hole in said securing pin when said securing pin is inserted through said opening in said coupling pin thereby inhibiting said securing pin from being removed from said opening in said coupling pin.

7. A fork moving assembly for facilitating forks of a telehandler machine to be maneuvered with an incompatible skid steer, said assembly comprising:

an adapter plate having a hitch tube being insertable into a hitch receiver that is attached to a skid steer thereby facilitating said adapter plate to be maneuvered by said skid steer, said adapter plate having a pair of attachment points being spaced apart from each other and extending in an opposite direction from said hitch tube, said adapter plate having a front surface, a back surface and a perimeter edge extending between said front surface and said back surface, said perimeter edge having a top side, a bottom side, a first lateral side and a second lateral side, said adapter plate having a pair of lobes cach being disposed on a respective one of said first lateral side and said second lateral side, each of said lobes being aligned with said top side of said perimeter edge, each of said lobes lying on a plane being perpendicularly oriented with said front surface, each of said lobes being oriented to angle upwardly beyond said top side of said perimeter edge, each of said lobes having a hole extending through a first lateral surface and a second lateral surface of said lobes such that said hole in each of said lobes defines a respective one of said attachment points, said adapter plate having a first bend extending between said first lateral side and said second lateral side of said perimeter edge to define a top portion of said adapter plate forming an angle with a middle portion of said adapter plate, said adapter plate having a second bend extending between said first lateral side and said second lateral side of said perimeter edge to define a bottom portion of said adapter plate forming an angle with said middle portion, said bottom portion lying on a plane being perpendicularly oriented with said top portion, each of said first lateral side and said second lateral side of said perimeter edge having a middle section angling inwardly between an upper section and a lower section of a respective first lateral side and second lateral side, said upper section of each of said first lateral side and said second lateral side being associated with said top portion of said adapter plate, said middle section of each of said first lateral side and said second lateral side being associated with said middle portion of said adapter plate, said lower section of each of said first lateral side and said second lateral side being associated with said bottom portion of said adapter plate, said hitch tube having a first end being coupled to said back surface of said adapter plate, said hitch tube being positioned on said top portion of said adapter plate, said hitch tube being centrally positioned on said top portion, said hitch tube having a plurality of exterior surfaces intersecting each other such that said hitch tube has a rectangular shape, said adapter plate having a fork slot extending through said front surface and said back surface of said adapter plate thereby facilitating said fork slot to accommodate a fork of said skid steer when said skid steer does not have a hitch receiver to receive said hitch tube;

a coupling pin being insertable through each of said attachment points on said adapter plate having said coupling pin extending through a pin collar on a telehandler fork thereby facilitating said skid steer to maneuver said telehandler fork wherein said coupling pin and said adapter plate are configured to facilitate said telehandler fork to be maneuvered without having to be manually carried, said coupling pin having a primary end and a secondary end, said coupling pin having a washer being coupled to said primary end having said washer lying on a plane being oriented perpendicular to an axis extending through said primary end and said secondary end, said washer abutting a respective one of said lobes when said coupling pin is inserted through said hole in said respective lobe having said coupling pin extending through said hole in an opposing one of said lobes with respect to said respective lobe, said coupling pin having an opening extending through said coupling pin, said opening being spaced from said secondary end of said coupling pin;

a securing pin being insertable through said opening in said coupling pin when said coupling pin is inserted through said hole in each of said pair of lobes thereby inhibiting said coupling pin from being removed from said hole in each of said pair of lobes, said securing pin having a hole extending through said securing pin;

a cable being attached to a said securing pin; and a cotter pin being attached to said cable, said cotter pin being insertable through said hole in said securing pin when said securing pin is inserted through said opening in said coupling pin thereby inhibiting said securing pin from being removed from said opening in said coupling pin.

* * * * *